July 9, 1929.    LE ROY L. HOLMES    1,720,076
SAFETY DEVICE FOR AUTOMOBILES
Filed July 18, 1927    2 Sheets-Sheet 1

Le Roy L. Holmes.    INVENTOR.

BY Richard B. Owen.
ATTORNEYS.

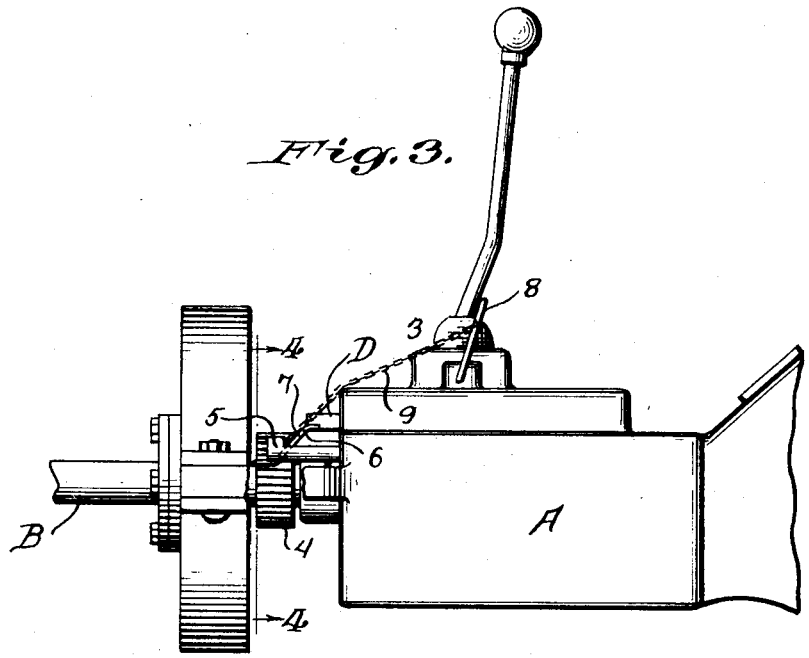
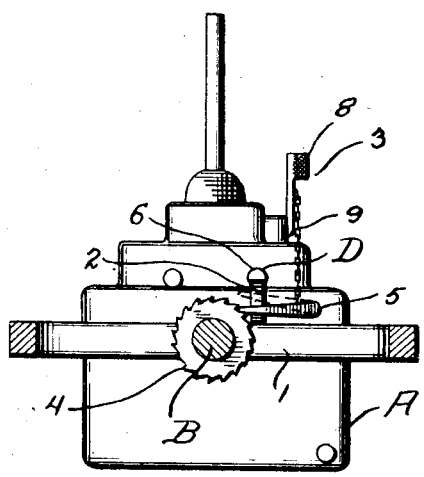

Patented July 9, 1929.

1,720,076

UNITED STATES PATENT OFFICE.

LE ROY L. HOLMES, OF MABTON, WASHINGTON.

SAFETY DEVICE FOR AUTOMOBILES.

Application filed July 18, 1927. Serial No. 206,693.

This invention relates to a safety device for automobiles and has for its primary object the construction of a device that may be interposed between the drive mechanism of the automobile and the transmission mechanism so that upon shifting of the transmission mechanism to a predetermined position an interlocking engagement will be established with the drive mechanism for preventing movement thereof.

An object of the invention is the design of a safety device automatically or manually controlled thereby enabling the device to be automatically operated according to the direction of travel of the automobile or to be manually rendered inactive so that under certain conditions the automobile is free to travel in any direction.

Another object of the invention is the provision of an interlocking device associated with the drive shaft of the automobile and under the control of the shiftable movements of the transmission mechanism so that the automobile may be locked against drifting backward during the shifting of the gears.

Besides the above, my invention is distinguished in the simplicity of construction of the various parts of the invention which materially reduces the cost of manufacture and facilitates the installation of the device upon all makes of cars now manufactured.

With these and other objects in view, the invention will be better understood from the following detailed description taken in connection with the accompanying drawings, wherein:

Figure 3 is a view similar to Figure 2 showing the parts in operative position, and Figure 4 is a cross sectional view.

Figure 1:
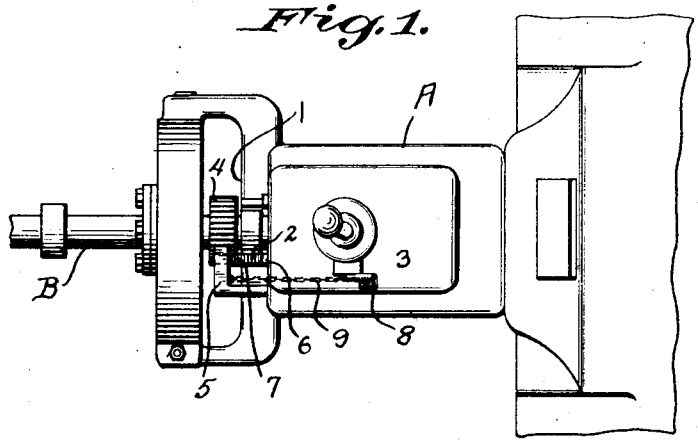
Figure 1 is a top plan view of the device in applied position.
Figure 2:
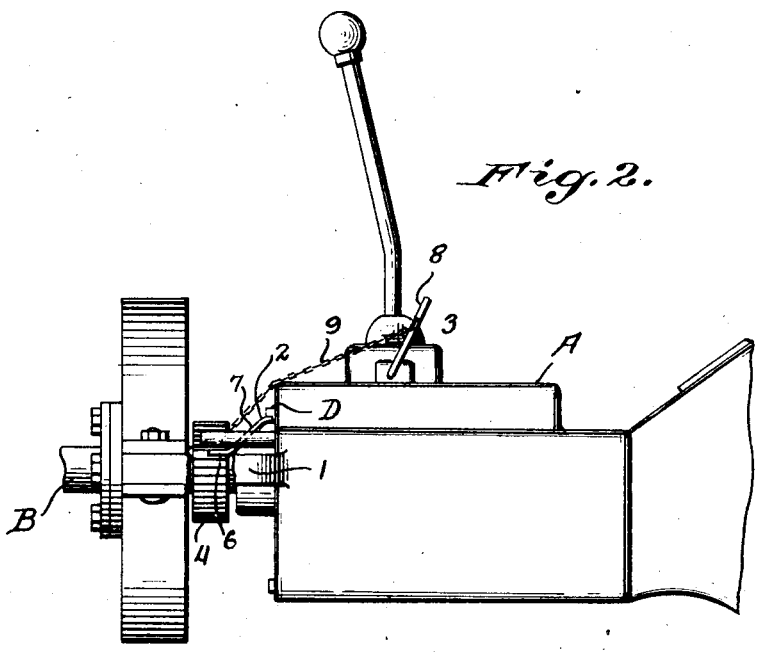
Figure 2 is a side elevation of the parts in operative position.

Again referring to the drawings illustrating one of the many constructions of my device, the invention broadly stated, consists of a lock device 1 associated with the driving mechanism of the automobile, an automatic releasing structure 2 under the control of the transmission mechanism of the automobile and a manually operated releasing mechanism 3 all of which are so related as to be compactly arranged in the confined space directly behind the transmission housing A of the automobile.

The locking device designated in its entirety by the numeral 1 consists of a ratchet wheel 4 directly secured to the drive shaft B of the vehicle. This ratchet wheel 4 is operatively associated with a vertically swinging dog 5 properly connected to the housing of the transmission mechanism so as to be readily swung to an operative or inoperative position relative to the ratchet wheel. This dog 5 is operatively associated with the transmission mechanism so as to be automatically operated in the shifting of the mechanism and this may be accomplished in various ways but for the purpose of illustration, I have shown the automatically releasing element 6 directly secured to one of the shifter rods D of the transmission mechanism. In this particular construction of the invention, this element 6 has a cam surface 7 arranged to have a cam action with the under surface of the dog 5 to lift the same when the transmission mechanism has been moved to a predetermined position.

As far as I have proceeded, it will be appreciated that in the shifting of the transmission mechanism the dog 5 is selectively moved into and out of operative engagement with the ratchet wheel by the co-operative engagement and disengagement of the element 6 with the dog. In the drawings the parts are so designed and interrelated that in the shifting of the transmission mechanism in the forward travel of the automobile the dog will move into operative engagement with the ratchet wheel to prevent drifting backward but should occasion arise necessitating the backing of the automobile, reversing of the transmission mechanism by hand, automatically moves the element 6 into position to release the dog from the ratchet wheel. Thus it will be appreciated that the drive mechanism of the automobile is automatically locked against movement in a predetermined direction during the shifting of the mechanism which is of a decided advantage in driving up a hill, as inexperienced drivers quite often experience great difficulty in changing gears on a hill. It is of course, to be understood that the heretofore described parts may be so designed as to enable the drive mechanism to automatically lock when the car has been stopped and besides may be arranged to function as an emergency brake.

For the purpose of enabling the device to be manually operated, to render the automatic device inactive, I have illustrated a manually operated releasing mechanism designated in its entirety by the numeral 3 and consisting of a foot pedal 8 swingingly connected to the housing of the transmission mechanism and having a flexible connection with the dog 5 illustrated in this particular construction of my invention as a chain 9. The pedal 8 may be constructed to be automatically locked in position to release dog 5 from the wheel 4 under certain conditions.

In the application of my invention to an automobile, the ratchet wheel 4 is directly secured to the drive shaft preferably at the point directly behind the transmission mechanism so as to be operatively associated with the dog swingingly connected to the transmission housing. Attachment of the element 6 to the shifter rod D with the cam portion 7 contiguous to the dog, sliding movement of the rod D automatically controls movement of the dog to operative or inoperative position relative to the ratchet wheel 4. Thus, the locking device is rendered active or inactive according to change in positions of the transmission mechanism.

When it is desired to release the locking device independently of the automatic device, it is only necessary to exert pressure on the foot pedal 8 to lift the dog 5 away from the ratchet wheel through the chain connection 9.

In concluding, I wish to state that the different devices may be constructed in various other manners than illustrated and associated in other relations and besides slight changes may be made to accomplish various other results than set forth in the present application, and therefore, I do not desire to be limited in protection in any manner except as set forth in the following claims.

What I claim is:

1. In combination with the transmission mechanism and drive shaft of an automobile, a ratchet wheel secured to the drive shaft, a dog operatively associated with the ratchet wheel, operative connection between the dog and an element of the transmission mechanism for controlling the operative engagement of the dog with the ratchet wheel according to the adjustment of the transmission mechanism, and directly manually operable means connected with the dog to render the same inactive.

2. In combination with the transmission mechanism and drive shaft of an automobile, a ratchet wheel secured to the drive shaft, a dog for coaction therewith, a release element actuated by an element of the transmission mechanism and movable out of and into operative engagement with said dog for effecting movement of the dog into and out of engagement with said ratchet wheel, and directly manually operated release means including an element for coaction with said dog to move the same to inactive position independent of said transmission element.

3. A safety device for automobiles comprising a ratchet wheel for connection with a portion of the drive mechanism of the automobile, a dog normally tending to engage, by gravity with said ratchet wheel, means for moving the dog out of such engagement in the shifting of the transmission mechanism of the automobile to a predetermined adjustment, and release means directly manually operable independently of said transmission mechanism, for moving said dog to an inactive position.

4. A safety device for automobiles comprising a ratchet wheel for connection to an element of the drive mechanism of the automobile, a dog mounted for movement into and out of locking engagement with said ratchet wheel, a release element for the dog having means for operative connection with a portion of the transmission mechanism of the automobile, and means directly manually operable to effect adjustment of the dog to inactive position.

5. A safety device for automobiles comprising a ratchet wheel for connection to an element of the drive mechanism of the automobile, a dog mounted for movement into and out of locking engagement with said ratchet wheel, a release element for the dog having means for operative connection with a portion of the transmission mechanism of the automobile, and manually operable means for moving the dog to inactive position, said means including a foot operated member and a flexible connection between the member and said dog.

6. In a device of the class described, the combination with the drive shaft of an automobile and a shiftable element of the gear shift thereof, of a ratchet wheel mounted upon and rotatable with the said shaft, a dog pivotally supported and resting by gravity in engagement with the ratchet wheel, a releasing element carried by the shiftable element of the gear shift and extending downwardly therefrom at an angle and engaging beneath the dog and constituting means for elevating the dog in the shifting of said element in one direction, a foot pedal, and a flexible connection between the foot pedal and dog whereby movement of the pedal in one direction will effect elevation of the dog out of engagement with said ratchet wheel.

In testimony whereof I affix my signature.

LE ROY L. HOLMES.